United States Patent

Holm

[15] 3,673,574

[45] June 27, 1972

[54] NET FLUID COMPUTING UNIT FOR USE WITH CENTRAL COMPUTER

[72] Inventor: Wayne E. Holm, Costa Mesa, Calif.

[73] Assignee: Hydril Company, Los Angeles, Calif.

[22] Filed: Feb. 2, 1970

[21] Appl. No.: 7,940

[52] U.S. Cl. .................................. 340/172.5, 235/151.35
[51] Int. Cl. ................................................. G01f 5/00
[58] Field of Search ............... 340/172.5, 347; 235/151.35

[56] References Cited

UNITED STATES PATENTS

| 3,578,405 | 5/1971 | Woodle | 235/151.35 |
|---|---|---|---|
| 3,553,444 | 1/1971 | Tong | 235/151.35 |
| 3,108,929 | 10/1963 | Tolin et al. | 235/151.35 |
| 3,027,086 | 3/1962 | Hargens et al. | 235/151.35 |
| 3,337,855 | 8/1967 | Richard et al. | 340/172.5 |
| 3,361,897 | 1/1968 | Rush | 340/172.5 |
| 3,387,282 | 6/1968 | Vacques | 340/172.5 |
| 3,412,241 | 11/1968 | Spence et al. | 235/151.35 |
| 3,430,206 | 2/1969 | Ernyei et al. | 340/172.5 |
| 3,449,725 | 6/1969 | Eckelkamp et al. | 340/347 |
| 3,526,757 | 9/1970 | Rees et al. | 340/172.5 |

Primary Examiner—Paul J. Henon
Assistant Examiner—Mark Edward Nusbaum
Attorney—White & Haefliger

[57] ABSTRACT

A computing unit usable in a system for computing the quantity of fluid A in a mixture of fluids A plus B flowing during selected intervals of time includes: an accumulator for pulses produced by suitable metering means, each pulse representing the flow of a predetermined quantity of a mixture of fluids A plus B (as for example oil and water); the accumulator having an output which represents the total quantity of fluid A plus B flowing during at least one of the intervals; a converter responsive to such pulses repeatedly to digitize an input signal which represents the proportion of fluid A in the mixture, and as a function of pulse reception, there being an output register connected to receive the digitized signal; and an accumulator for the contents of the register to accumulate a digital quantity which represents the net amount of fluid A in the mixture that has flowed from the beginning of that one interval.

15 Claims, 6 Drawing Figures

INVENTOR.
WAYNE E. HOLM
By White & Haefliger
ATTORNEYS.

INVENTOR.
WAYNE E. HOLM
By White & Haefliger
ATTORNEYS.

NET FLUID COMPUTING UNIT FOR USE WITH CENTRAL COMPUTER

BACKGROUND OF THE INVENTION

This invention relates generally to telemetry and control systems, and more particularly concerns the preliminary processing and storage of data gathered from multiple transducers at a location which may be relatively close to the transducers, for subsequent transmission to a central processor. The discussion of the concepts and principles of the invention will for the most part be directed to monitoring and determination of total flow of a mixture of fluids as well as net flow of at least one of such liquids, as for example oil and gas.

In oil production on fields which have many leases, payment must be made to each lessor for the oil or gas taken from his property, necessitating accurate measurement of total fluid flow and oil flow, over intervals of time. Normally, crude oil from each well on a lease in piped to a central collection point where it is treated to allow the separation of natural gas, and the separation of oil and water. This is an initial treatment, and some water is left in the oil. Treatment may be performed in continuous flow, and in addition by the batch, at intervals, but in either case total fluid flow (oil and water) from a battery may be sensed by a positive displacement (PD) meter, and percent oil is sensed by a basic-sediment-and-water (BS and W) probe.

The output of the PD meter may for example be an electrical pulse of 30 to 40 milliseconds duration, the pulse representing a fraction of a barrel of total fluid flow (oil and water). The fraction may contain only one significant digit, so that it is of the type 0.1, 0.06, 0.003 for example. While the output of any one PD meter always represents the same fraction, the outputs of different PD meters may represent different fractions. BS and W probes are of two types, one having an analog voltage output and the other having a frequency output. In either case, the output varies as a function of percent oil in the total fluid (oil and water). The PD meters and BS and W probes, being independently operated devices, have asynchronous outputs, and in actual practice it is possible to transmit such outputs from a large number (say hundreds) of measurement locations or stations to a central computer for computation of the net oil flow. For example, the product of the PD meter pulse (representing total flow at a given instant) and the BS and W probe output (representing the oil fraction in the total flow at a given instant) is proportional to the net oil flow at that instant, correction by suitable calibration constant yielding net oil flow. However, it is found that the data bandwidth requirements for a computer-based system becomes very large for the high sampling rates needed for accuracy where data from hundreds of stations is sampled, necessitating a large, expensive central computer installation. As one example, assuming that in an asynchronous system with PD meter pulse width of 30 milliseconds and as many as 32 PD meters per remote terminal unit, and 100 remote terminal units per insulation and an accuracy requirement of ten bits per PD meter pulse, then the total maximum data rate would be 960,000 bits per second (i.e., 32 × 100 × 10 × 30 = 960,000).

SUMMARY OF THE INVENTION

It is a major object of the invention to provide a means for overcoming the above problems in a manner resulting in a number of advantages, as outlined below. Basically, the invention contemplates the provision of a synchronous system wherein asynchronous data (as for example representing total flow, and percent oil in the flow) may be acquired in accumulators at each remote terminal unit. The remote terminal units (RTUs) may then be scanned, synchronously, by a central digital computer, the bandwidth requirements of data transmission being very much smaller than for the asynchronous system described above. For example, if each RTU were scanned once every 10 seconds, and there were 100 RTUs each with 32 PD meters and data accuracy of 10 bits, then the bit rate would be 4,800 bits per second since only 30 samples of a 10 bit number would have to be accumulated which only requires a 15 bit accumulator (i.e., 32 × 100 × 1/10 × 15 = 4,800).

It is a further object of the invention to provide RTUs especially adapted for use in such a synchronous system, each RTU comprising an accumulator for pulses produced by suitable metering means, each pulse representing the flow of a predetermined quantity of a mixture of fluids A plus B (as for example oil and water), the accumulator having an output which at any time represents the total quantity of fluid A plus B flowing from the beginning of a selected interval of time; a converter (analog to digital, or frequency to digital) responsive to such pulses to digitize a transducer produced input signal which at any time represents the proportion of fluid A in the mixture A plus B flowing at that time (as for example the percent oil in the oil and water mix), there being an output register connected to receive the digitized signal; and an accumulator for the contents of the register to accumulate a quantity which at any time represents the net amount of fluid A in the mixture A plus B that has flowed from the beginning of that interval. As mentioned, a computing system may include a number of such computing units (or remote terminal units, i.e. RTU's), asynchronously acquiring data in the accumulators, the system including a central computer operatively connected in synchronous scanning relation with multiple accumulators defined by the RTUs.

Other advantages include: a lower sampling-rate capacity required of the central computer input/output bus; fewer priority interrupts required of the central computer; smaller core storage for the central computer is needed since the core need not be sized to accommodate peak possible data rates; data reliability is greater because data is stored in both the central computer and the RTUs, with concomitant reduced probability of loss of data from any one equipment malfunction; and a conversion to manual operation in the event of computer malfunction is easier because the data is stored in the RTU accumulator.

As will be seen, the invention overcomes disadvantages of prior systems in that it provides time shareability of the conversion means; it provides an incremental volume process as respects the flowmeter and may operate directly with a positive displacement meter or any other flow measuring device which can be caused to produce a pulse representing an increment of fluid flow (as distinguished from prior devices wherein frequency operation negates operation with a pulse). Also, the invention enables direct measurement of total volume and percent thereof of the to-be-measured-constituent, rather than percentages of wanted and unwanted constituents and then summing them.

It is a further object of the invention to provide a net oil computing system which may be time shared with a gas flow computing system, as will be described.

These and other objects and advantages of the invention, as well as the details of illustrative embodiments, will be more fully understood from the following description and drawings, in which:

DRAWING DESCRIPTION

FIG. 1 is a system block diagram;
FIG. 2 is a block diagram of a remote terminal unit;
FIGS. 3 and 4 are elevations showing flow transducers;
FIG. 5 is a waveform diagram; and
FIG. 6 is a modified system block diagram.

DETAILED DESCRIPTION

Figure 1:
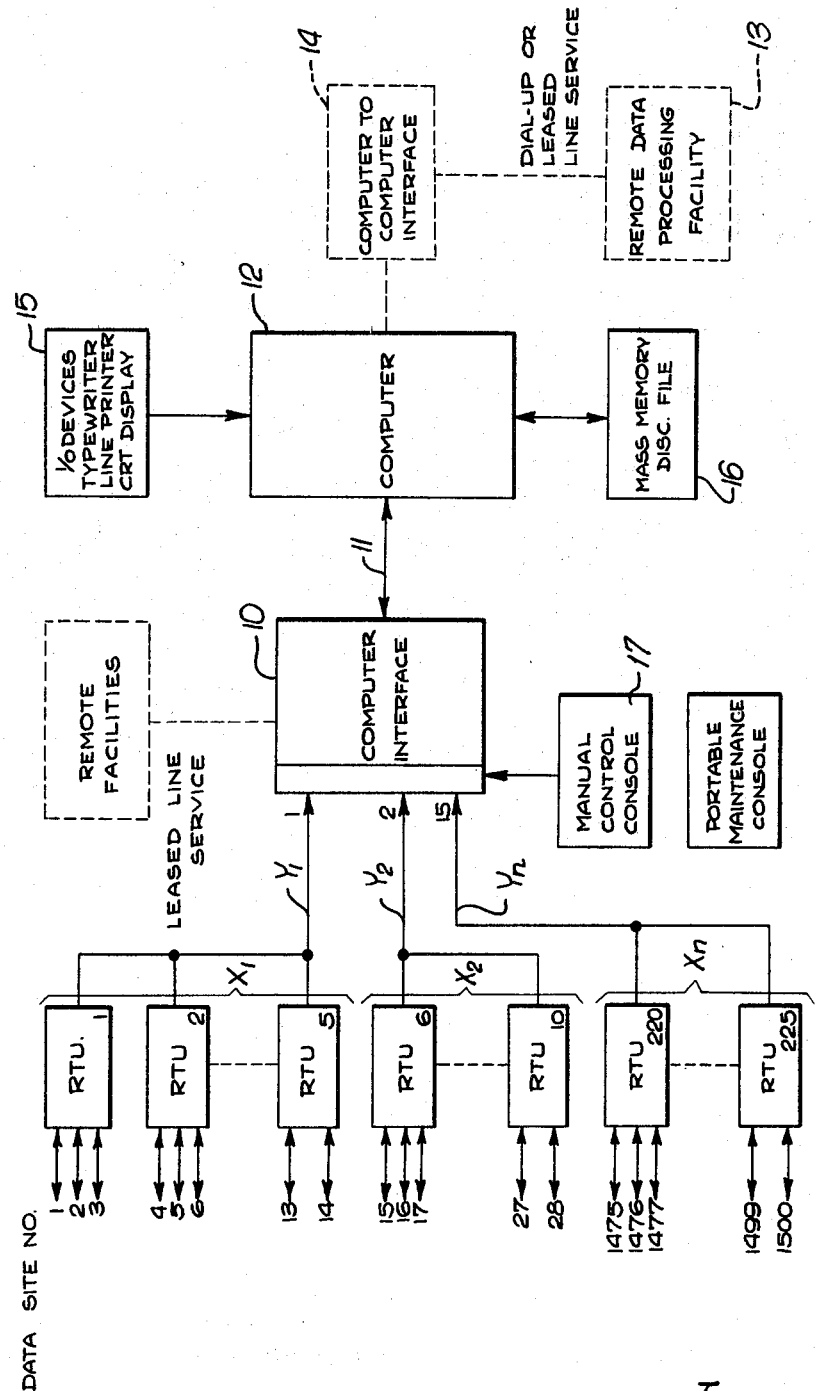

Referring first to FIG. 1, a first series of remote terminal units (RTUs) is indicated at $X_1$ as connected with a party line $Y_1$; another series of RTUs is indicated at $X_2$ as connected with party line $Y_2$; and a third series of RTUs $X_n$ is connected with party line $Y_n$. The party lines are also connected with a computer interface unit 10 which is connected at 11 with the computer 12, the latter being connectable if desired to the remote data processing facility 13 via interface 14. Input/output devices 15 and disc file 16 are connected with computer 12; and manual control console 17 is connected with the unit 10. It will be understood that the computer 12 scans the RTUs (and specifically the data storage units thereof) on a repetitive basis.

Figure 2:
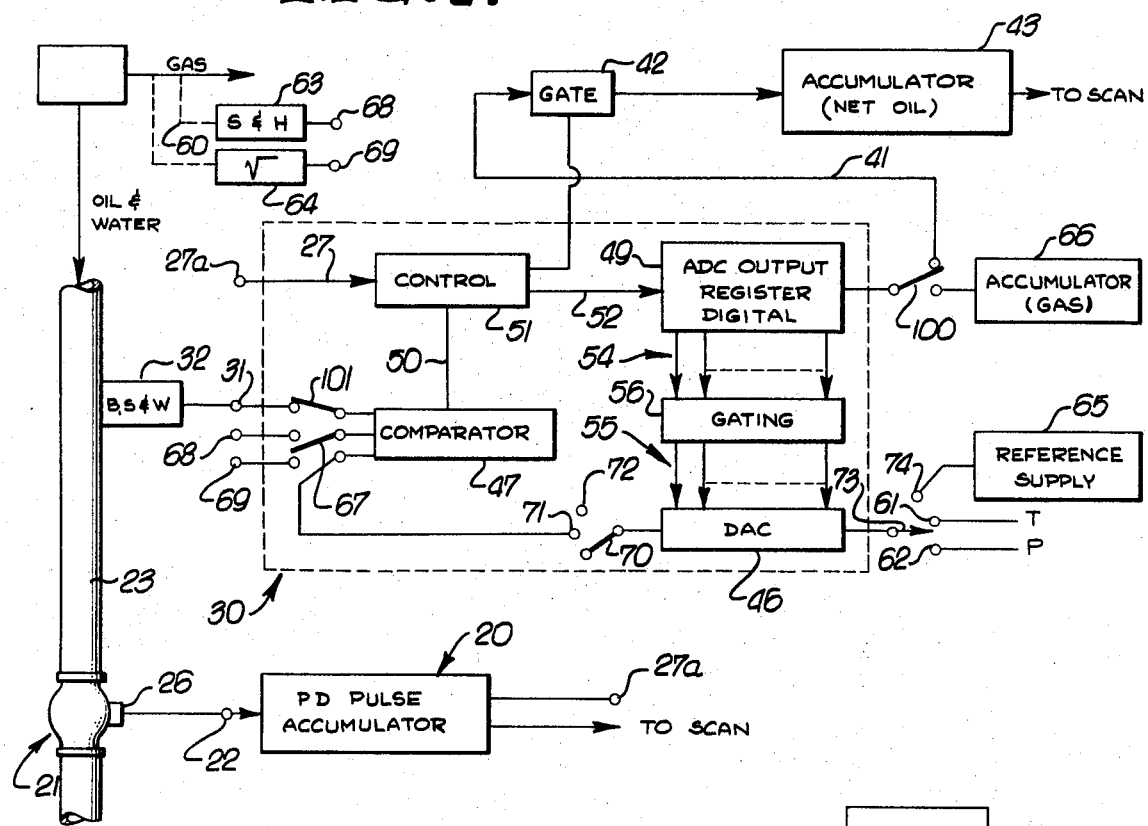
Figure 4:
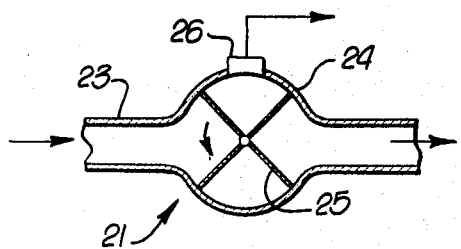
Figure 5:
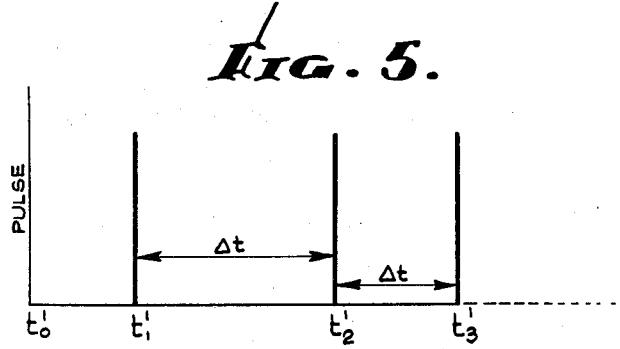

Referring to FIG. 2, each RTU illustrated at X incorporates a first accumulator 20 for pulses produced by positive displacement metering means as indicated at 21, the accumulator having an input terminal at 22. Each pulse represents the flow of a predetermined quantity of a mixture of fluids A plus B, as for example oil and water flowing in line 23 from the collection point mentioned above. FIG. 4 shows, schematically, one form of metering means as including a chamber 24 connected in series with line 23, and containing a vaned rotor 25 the rotation of which is proportional to the flow. A sensor 26, as for example a magnetic pick-up, produces an output pulse each time the rotor rotates through a predetermined angle, so that flow increments are in effect counted by the accumulator 20. FIG. 5 shows the occurrence of pulses at the ends of times $t_1^1$, $t_2^1$ and $t_3^2$, the intervals $\Delta t$ being variable to correspond to variable flow rates. Alternatively, other pulse producing devices are usable (as for example a turbine meter coupled with a counter, or "ionization" meters).

Figure 3:
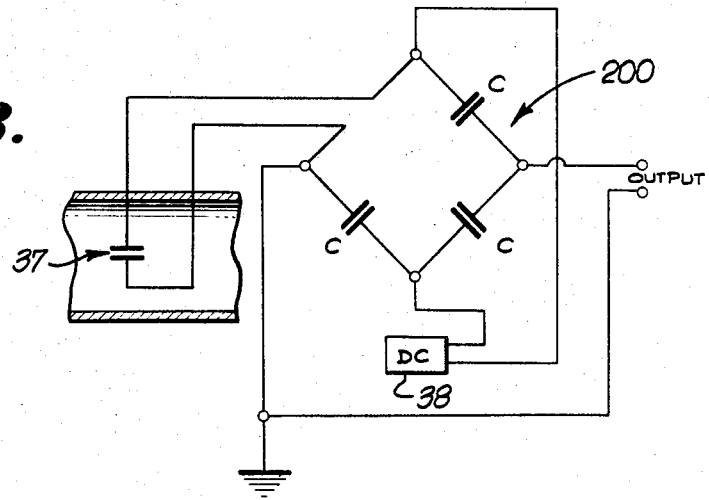

The RTU X also incorporates a converter (as for example analog to digital converter 30, or a frequency to digital converter) responsive to each pulse (or a selected number of pulses) to digitize a transducer produced input signal (say at input terminal 31) which at any time represents the proportion of fluid A in the mixture A plus B flowing at that time. For example, the input signal at terminal 31 may represent the fraction of oil in the oil and water mix flowing in line 23, there being a basic-sediment-and-water probe or transducer 32 to produce that signal. One such probe is represented by the capacitor 37 in FIG. 3, connected in a capacitance bridge 200 as shown, energized at 38. The oil and water mix flows between the capacitor plates and the dielectric strength is thereby varied as a function of the oil fraction, so that the bridge output signal applied to terminal 31 of FIG. 3 varies correspondingly.

Converter 30 in effect "multiplies" the inputs at terminals 31 and 27a, to produce a digital output at 41 which represents the net amount of fluid A (say oil) in the incremental mixture that has flowed during the variable pulse interval, say $\Delta t$. That is, a pulse at terminal 27a operates via control 51 to "enable" the conversion or digitizing, as referred to. That output at 41 is transmitted via a suitable gate 42 to an accumulator 43 in which is accumulated a quantity which at any time represents the net amount of fluid A in the mixture A plus B that has flowed during multiple pulse intervals, as for example from the beginning $t_0$ of the pulse intervals in FIG. 5. Similarly, accumulator 20 accumulates a quantity which at any time represents the total amount of fluid in the mix A plus B that has flowed during those same multiple pulse intervals. For example, if each pulse represents 0.01 barrels of oil and water, and if the input signal at 31 represents 96.2 percent oil, the decimal value 0.00962 barrels of oil would be transmitted at 41; also the decimal value 0.01 oil and water would be added to accumulator 20. Therefore, the accumulators may be synchronously scanned at some rate which may or may not be related to $\Delta t$, and as described above.

Referring again to the converter, it may advantageously comprise an analog to digital converter 30 shown in FIG. 2 as including a resistance ladder represented by digital to analog converter (DAC) 46 having reference input via switch 73. The converter 30 also has an output register 49 receiving input from terminal 31, as via a comparator 47 having output 50, and a control 51 having output 52. The digital value stored in the register 49 is transmitted at 54 and 55 via gating 56 to the DAC to complete the loop.

It will be noted that the same ADC 30 may also be used, on a time shared basis, to compute the value of a quantity $(\Delta P/T \times P)^{1/2}$ representing total net flow Q of gas in a line (as for example gas separated from the oil and water in the battery referred to above), and in the manner described in my copending application, "REMOTE TERMINAL COMPUTING UNIT FOR USE WITH CENTRAL COMPUTER." For that purpose, there may be input terminal 60 for a signal representing the gas pressure differential $\Delta P$ across an orifice in the gas line; 61 for a signal representing temperature T in the gas line; and 62 for a signal representing the pressure P in the gas line. In that event, additional elements to enable such computation include the sample and hold amplifier 63, square root amplifier 64, reference supply 65; and accumulator 66 connectable by switch 100 to the output of the register 49. Also, note switch 67 operable between outputs 68 and 69 of the elements 63 and 64; switch 101 to control connection of the comparator 47 with probe 32; switch 70 to connect the DAC output alternately to gating 42, to the terminal 71 connected to the comparator input, and to the terminal 72 connected to the square root amplifier input; and switch 73 alternately connectable to terminals 61, 62 and 74 (connected to reference supply 75). Control 51 may control switch operation in various modes.

In the event of such time shared operation, the ADC 30 is operable successively in four modes, the first three of which are described in said companion application in connection with successive time intervals $t_1$, $t_2$ and $t_3$. The fourth mode would occur during a fourth time interval and be as described herein for the connections shown in FIG. 2, the control 51 operating the appropriate switches for mode control.

Figure 6:
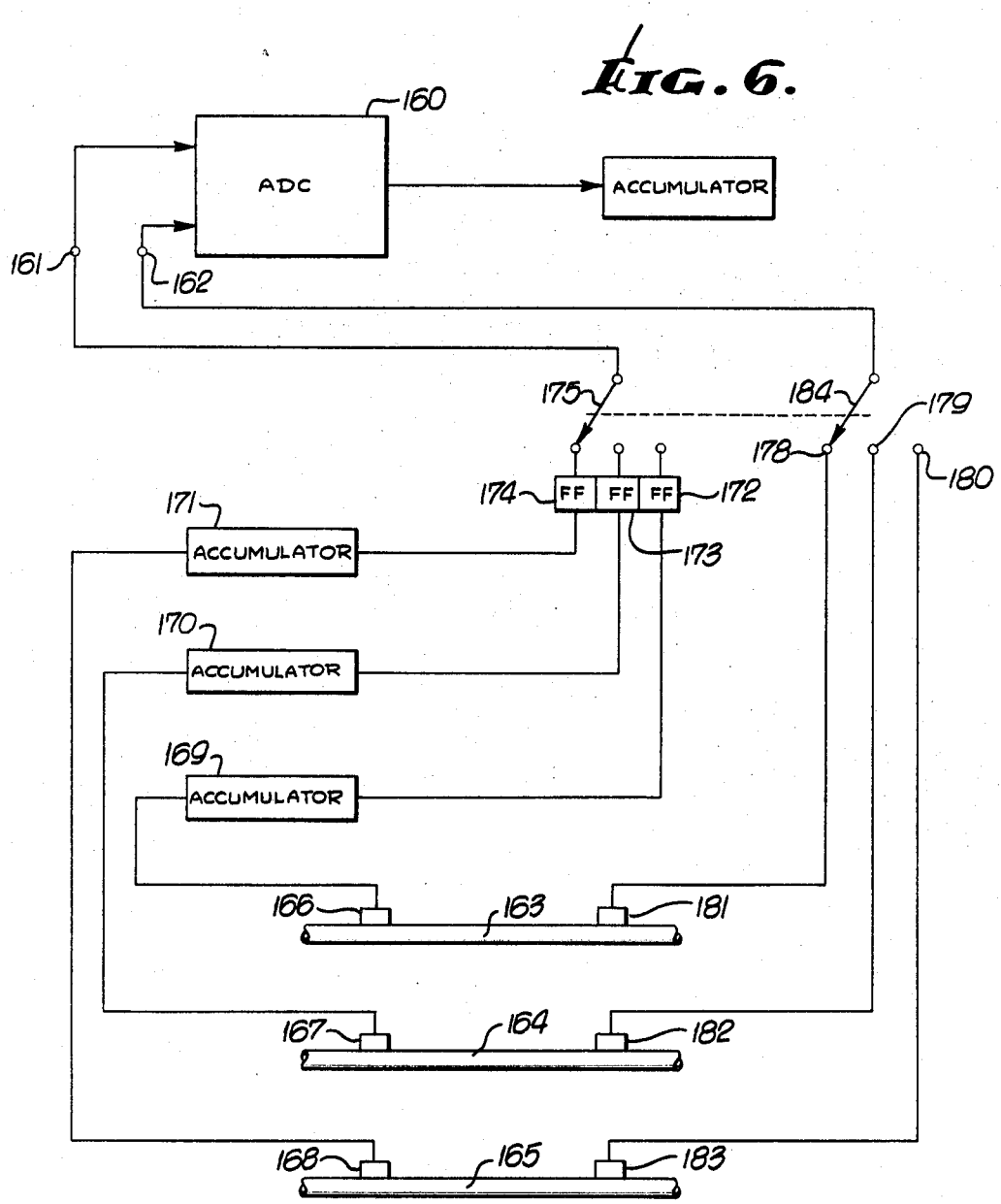

Finally, FIG. 6 shows a single ADC 160 having an input terminal 161 for pulses, and another input terminal 162 for input signals representing oil or water fractions in the total flow in different pipe lines 163, 164 and 165. PD meters are indicated at 166, 167 and 168 with outputs to accumulators 169 – 171. Pulses are transmitted to flip-flops 172 – 174 to set them for scanning as by a suitable means represented by wiper 175 connected to terminal 161. Such operation is possible since the pulse durations are on the order of 10 – 30 milliseconds, whereas the conversion (digitizing) rate of the ADC is on the order of a few microseconds. The flip-flops will not be re-set until scanning is completed, a condition favored by the relative pulse duration and conversion times. Terminals 178, 179 and 180 (to which oil fraction signals are transmitted by transducers 181 – 183) are also scanned as by means represented by wiper 184, such scanning being synchronized with scanning of the pulses stored by the corresponding flip-flops. Accordingly, one RTU is able to serve a large number of total flow and fractional flow sensors or transducers, as described.

Wherever the term "fluid" is used herein, it includes flowable streams whether gaseous, liquid or solid (as for example fluid concrete, molten metal, etc.).

Various of the blocks shown in the figures may be further exemplified by way of example, as follows:

| Item | |
|---|---|
| 12 | A digital computer, as for example Interdata Models II, III and IV, as described in Auerbach Scientific and Control Computer Reports, January 1969. |
| 10 | A suitable interface between the terminal units and computer, for example including a Channel multiplexer, channel sequence control logic for input and output data, data formating logic and level buffering, as is well known in the art, and as may be considered part of computer $12_1$, as described in said Auerbach publication. |
| 20 | A binary counter as described in Chapter 2 of the text, "Digital Counters and Computers" by E. Bukstein, published in 1960 by Harcourt, Brace and World, New York, New York. |
| 46 | A digital to analog converter of the type described at pp. 1 and 27 of "Analog/Digital Conversion Handbook" published in 1964 by Digital Equipment Corporation, Maynard, Massachusetts. |
| 49 | Output register as described at pages 4, 20 and 36 of the above referenced "Analog/Digital Conversion Handbook". |

| | |
|---|---|
| 51 | Control logic as described in the above referenced "Analog/Digital Conversion Handbook", page 37. |
| 56 | Gating as described at page 27 of the above referenced "Analog/Digital Conversion Handbook". |
| 63 & 64 | Devices as described in Wayne E. Holm U.S. Patent application Ser. No. 7,828, filed February 2, 1970. |
| 65 | A reference power supply used as a voltage reference source, and as described at page 43 of the above referenced "Analog/Digital Conversion Handbook". |

I claim:

1. In a system computing the quantity of fluid A in a mixture of fluids A plus B flowing in a line during selected intervals of time, the system including first means producing pulses each representing the flow of a predetermined quantity of said mixture, a computing unit comprising:
   a. a first accumulator electrically connected with said means and accumulating said pulses, the accumulator producing an output which represents the total quantity of fluid A plus B flowing during at least one of said intervals,
   b. a converter electrically connected with the accumulator and responding to said first means pulses to digitize an input signal which represents the proportion of fluid A in the mixture A plus B, and as said pulses are received, and a transducer connected in said line and producing said input signal, there being an output register receiving the digitized signal, and
   c. another accumulator electrically connected with said register and accumulating a digital quantity which represents the net amount of fluid A in the mixture A plus B that has flowed from the beginning of that one interval.

2. The unit of claim 1 including an input terminal for said pulses, an input terminal for said input signal, and means generating said pulses and said input signal respectively applied to said terminals.

3. The unit of claim 2 wherein the converter includes a control circuit responding to pulse reception to enable said digitizing.

4. The unit of claim 3 wherein the converter comprises an ADC having a comparator connected between the input terminal for the input signal and said output register.

5. A computing system including a central computer, and multiple computing units as defined in claim 3, and which include multiple first accumulators and other accumulators, the computer connected with said first and other multiple accumulators to scan said outputs and said digital quantities.

6. A computing unit as defined in claim 1 wherein said first means include multiple positive displacement meters and multiple first accumulators receiving and storing pulses from said multiple positive displacement meters each pulse representing the flow of a predetermined quantity of fluid A plus B, the converter successively connected to said first accumulators.

7. The computing units as defined in claim 6 including multiple transducers connected with multiple flow lines to produce multiple of said input signals, and multiple input terminals for said input signal, the converter successively connected to said input terminals in synchronized relation to said successive connection to said first accumulators.

8. For use in a computing system, apparatus for computing the quantity of fluid A in a mixture of fluids A plus B flowing in a line during a selected interval of time, the combination comprising:
   a. first means for producing pulses each representing the flow of a predetermined quantity of fluid A plus B,
   b. accumulator means connected with said first means for accumulating said pulses and having an output which represents the total quantity of fluid A plus B flowing from the beginning of said interval,
   c. transducer means connected with said line to produce a signal which at any time represents the proportion of fluid A in the mixture A plus B flowing at that time,
   d. converter means connected to be responsive to said signal and to said first means pulses to digitize said signal as said pulses are received, there being an output register connected to receive the digitized signal, and
   e. another accumulator connected with the output of said output register to accumulate a digital quantity which at any time represents the net amount of fluid A in the mixture A plus B that has flowed from the beginning of said interval.

9. The combination of claim 8 wherein the converter includes a control circuit responding to pulse reception to enable said digitizing.

10. The combination of claim 9 wherein the converter comprises an ADC having a comparator connected between the input terminal for the input signal and said output register.

11. A computing system including a central computer, and multiple computing units each as defined by the combination of claim 8, the computer connected with the multiple accumulators to scan said outputs and said quantities.

12. The combination of claim 10 wherein the ADC includes a DAC, there being an input terminal for a variable T to be connected to the DAC to provide reference input, another input terminal for a variable $\Delta P$ to be connected to the ADC operating as a divider during a certain time interval to produce an output representative of the quantity $\Delta P/T$ to be transmitted to the DAC, and yet another input terminal for a variable P to be connected to the DAC operating as a multiplier during another time interval to produce an output representative of the quantity $\Delta P/T \times P$, said certain and other time intervals being separate from the time during which the converter operates to digitize said transducer produced signal as a function of pulse reception.

13. The method of computing the quantity of fluid A in a mixture of fluids A plus B flowing during selected intervals of time, said method comprising the steps of:
   a. accumulating pulses each representing the flow of a predetermined quantity of a mixture of fluids A plus B, and using the pulse accumulation to produce an output representing the total quantity of fluid A plus B flowing during at least one of such intervals, and producing an input signal which represents the proportion of fluid A in the mixture A plus B,
   b. receiving said pulses and said input signal and repeatedly digitizing said input signal upon repeated pulse reception, and storing the digitized input signal, and
   c. accumulating the stored digitized input signal to produce a digital quantity which represents the net amount of fluid A in the mixture A plus B that has flowed from the beginning of that one interval.

14. The method of claim 13 including the step of generating said pulses and said input signal.

15. The method that includes performing the computations as defined in claim 13 at each of a plurality of stations associated with different mixtures of fluids A plus B, and repeatedly and sequentially transmitting to a central computing location said outputs and digital quantities associated with said stations.

* * * * *

UNITED STATES PATENT OFFICE
CERTIFICATE OF CORRECTION

Patent No. 3,673,574   Dated June 27, 1972

Inventor(s) Wayne E. Holm

It is certified that error appears in the above-identified patent and that said Letters Patent are hereby corrected as shown below:

Column 5, lines 36 and 37;  "pulses, an input terminal for said input signal, and means generating said pulses and said input signal respectively ap- " should read --pulses, an input terminal for said input signal, said pulses and said input signal respectively ap- --

Column 5, line 59;  "minals for said input signal, the converter successively con- " should read --minals for said input signals, the converter successively con- --

Signed and sealed this 6th day of February 1973.

(SEAL)
Attest:

EDWARD M. FLETCHER, JR.
Attesting Officer

ROBERT GOTTSCHALK
Commissioner of Patents